United States Patent [19]
Appleby et al.

[11] 3,787,262
[45] Jan. 22, 1974

[54] TIRE BUILDING DRUM

[75] Inventors: Paul E. Appleby, Cuyahoga Falls; Max D. Brinkley, North Canton; Robert I. Griffiths, Akron, all of Ohio

[73] Assignee: The Goodyear Tire & Rubber Company, Akron, Ohio

[22] Filed: Sept. 24, 1971

[21] Appl. No.: 183,484

[52] U.S. Cl. .................. 156/123, 156/417, 156/420
[51] Int. Cl. ........................................... B29h 17/16
[58] Field of Search ... 156/110, 123, 133, 396, 414, 156/415, 417, 420

[56] References Cited
UNITED STATES PATENTS

| | | | |
|---|---|---|---|
| 3,388,024 | 6/1968 | Black et al. | 156/415 |
| 2,325,001 | 7/1943 | McLaughlin | 156/415 |
| 2,926,721 | 1/1960 | Haase | 156/415 |
| 3,374,138 | 3/1968 | Porter et al. | 156/417 |
| 1,954,764 | 4/1934 | Anderson | 156/415 |
| 1,869,656 | 8/1932 | Black | 156/415 |
| 2,367,772 | 1/1945 | Hasselquist et al. | 156/415 |
| 2,603,581 | 7/1952 | Erickson et al. | 156/415 X |
| 2,479,027 | 8/1949 | Sternad et al. | 156/396 |
| 3,687,756 | 8/1972 | Appleby et al. | 156/396 |

Primary Examiner—Clifton B. Cosby
Attorney, Agent, or Firm—F. W. Brunner; R. S. Washburn

[57] ABSTRACT

Method and apparatus for removing a tire too large for unassisted manual handling from a collapsible building drum. The drum comprises both articulated and individually removable segments and is collapsed after removal of certain segments by supporting the tire externally as by a crane sling, and moving the tire axially, axial movement of the tire being sufficient alone to cause the articulated segments to be collapsed permitting continued movement of the tire completely off the drum.

The foregoing abstract is not to be taken as limiting the invention of this application, and in order to understand the full nature and extent of the technical disclosure of this applciation, reference must be made to the accompanying drawings and the following detailed description.

The invention relates to building massive tires such as for earthmoving vehicles, and particularly to a method of and apparatus for removing such tires in the uncured state from a high-crowned drum on which the same are built.

18 Claims, 3 Drawing Figures

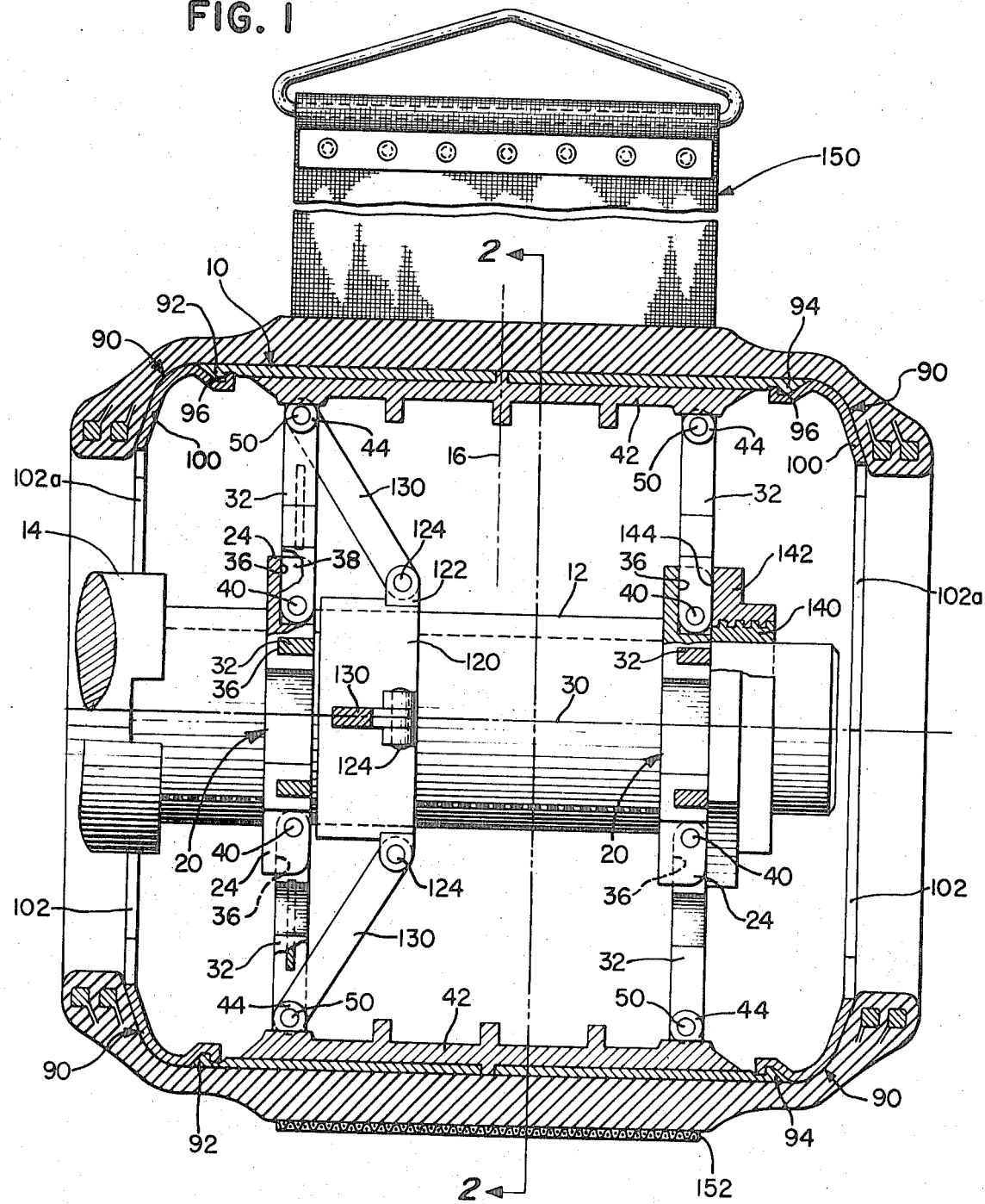

TIRE BUILDING DRUM

BACKGROUND OF THE INVENTION

A massive tire, as the term is used herein and in the appended claims, shall be understood to mean a tire of such size and weight that lifting, moving, and handling thereof is impractical by unassisted human effort. The uncured tires with which the present invention is particularly concerned are preferably built with bead and lower sidewall portions extended radially inwardly of the axially intermediate portion a substantial distance. This distance is commonly referred to as crown. In the presently preferred practice of building up such tires, the form on which the tires are built is provided with a generally cylindrical surface, the marginal ends of which are turned radially inwardly to form a shoulder and sidewall forming annulus. Still further inward radially and, in some cases axially inwardly, of the shoulder, the form provides support against which the bead core or cores are urged while the bead portion of a tire is being formed.

The crown of a tire-building drum refers to the relation of its outside diameter at and/or between the shoulders and the minimum or inside diameter of the bead of the uncured tire associated with such drum. As used herein, the term high-crown refers to and will be understood to mean such tires and tire-building drums which have between the two mentioned diameters a difference of at least four inches and commonly a difference of five or more inches. In the particular embodiment to be described presently, the high-crown drum and the tire differ in the respective diameters by approximately ten inches. The problems in handling such tires as have been described have long been recognized. The very large number of attempts at solving the problem of removing such tires from the building drums or forms on which they have been built is evidenced from the very large number of patents which set forth proposed solutions to the problem.

Removing the uncured tire from the building drum is still further complicated by the size and weight of the massive tires with which the present invention is concerned. Because of the size and weight of such tires, the central shaft which supports the drum for rotation requires stiffness to avoid undesirable deflection in use and is, therefore, of large diameter. The large diameter of the shaft on which the drum is mounted limits the annular space between the inside circumference of the bead and the shaft, thereby still further impeding the removal of the drum or parts thereof through the opening defined by the tire bead.

It has become a common practice to remove the tire and drum together from the tire-building machine and to dispose the assembled tire and drum on end, with the rotational axis vertical, in order to provide a degree of convenience for the removal of the several parts of the drum from within the tire. It has been found, however, that such tires can become undesirably distorted by their own weight when placed in an axially vertical position. Such distortion can occur with massive tires of multiple plies of organic materials. With tires constructed of metallic wire, the potential distortion in such practice is more severe and undesirable.

SUMMARY

It is, therefore, an object of the present invention to provide a method of and apparatus for overcoming the disadvantages of the prior art referred to. A further object is the provision of a method by which the tire can be removed from its building drum without significant distortion of the uncured tire during such removal.

An additional object is the provision of a method, and an apparatus to accomplish the method, by which the cost and manual effort required for the removal of an uncured tire from the drum on which it was built can be significantly reduced relative to the practices of the prior art.

The foregoing objects, as well as other objects and advantages which will become apparent or be particularly pointed out as the description proceeds, are accomplished in accordance with the invention by a method comprising removing from within the tire at least one pair of segments of a plurality of such segments while leaving unmoved a remainder of such segments the totality of which are cooperable to form the tire-building surface, supporting the tire externally and free of significant movement thereof while the drum is stationary, then effecting inward collapse of the remaining segments of the drum simply and only by moving the tire coaxially of itself and of the drum thereby inducing radially inward movement of the remaining at least one additional pair of segments, which are articulatedly connected to the central shaft of the drum, to a collapsed condition permitting further axial movement and removal of the tire from the drum.

In accordance with a further aspect, the invention provides a tire-building drum to carry out the above method which drum comprises a shaft, a plurality of parti-cylindrical first segments permanently and articulatedly connected to the shaft for axial and radial movement relative thereto, a plurality of second segments respectively detachably connected to and between successively adjacent pairs of said first segments, said first and second segments collectively cooperating to form, in the expanded condition of the drum, a circumferentially and axially continuous cylindrical tire-building surface, a pair of end rings each detachably engageable with the respective axial ends of the aforesaid segments, and a pair of links each pin-connected at its inner end to said shaft and at its outer end to a respectively associated one of said first segments to permit each such segment to move in an axial plane radially with respect to said shaft. The term, pin-connected, is used herein in the common sense and will be understood to mean that the members which are said to be pin-connected are movable angularly with respect to one another about the axis of a connecting or pivot pin which is supported by both, or by each pair, of such pin-connected members.

DRAWINGS

In the attached drawings:

FIG. 1 is an elevation view in axial cross-section of a tire-building drum in accordance with the invention, showing an uncured tire ready to be removed from the drum by the method according to the invention;

DETAILED DESCRIPTION

Figure 3:
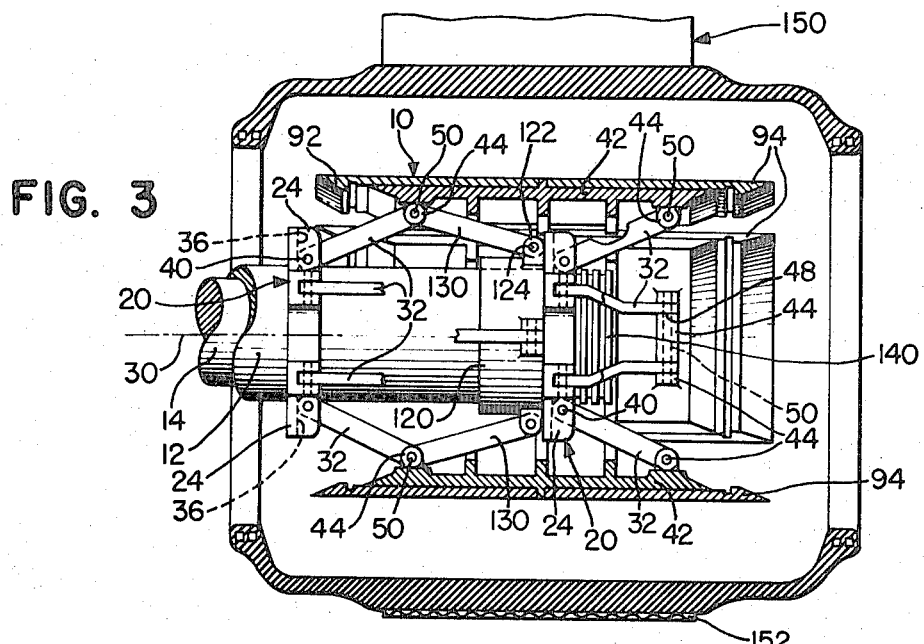
FIG. 3 is a view in axial cross-section illustrating a stage in the method according to the invention.

The solutions heretofore proposed to the problems mentioned above provide generally either for articulating each of all the plurality of segments comprising the tire-building drum, or for disassembly and removal, in a succession of parts, of all of such segments from within the tire. By the present invention, the removal of an uncured tire from a drum on which it is built is simplified and expedited by the provision of a building drum capable of being collapsed simply by movement of the tire coaxially of itself without requiring provision within the drum for causing the movement of the segments. This advantage is accomplished by the combination in the tire-building drum of a plurality of sets of segments which cooperate to provide, in the expanded condition of the drum, a circumferentially and axially continuous rigid tire-building surface. The individual parti-cylindrical segments of the first set at least, are articulatedly connected to the central shaft of the building drum. A second set of particylindrical segments are respectively each detachably connected to and between successively adjacent pairs of the segments of the first set and are capable of being manually removed. The segments of the second set can be either smaller or lighter in weight, or both, than the first segments. End rings or flanges, each composed of separable arcuate segments, are detachably joined to the respective ends of the first and second sets of segments to provide a rigid radially inwardly extending annular surface for the support of the sidewall and bead portions of the tire to be built.

To remove the tire after the same has been completed on the drum, the tire itself is supported externally, the weight thereof being assumed by a sling or the like carried by, for example, an overhead crane, coaxially of the drum and without significant movement. The segments composing the flanges or end rings are removed and the individual segments of the second set are then detached and removed. During removal of the segments of the end rings and of the second set of cylindrical segments, the individual segments of the first set, each of which is articulatedly connected to the center shaft, remain in contact with the tire and support it free of significant distortion. The sling is placed about the tire and lifted only sufficiently to transfer the weight of the tire from the drum and is then moved coaxially of the drum.

The axial movement of the tire, now carried by the sling, causes the articulated segments of the first set remaining therewithin to be collapsed simply and solely by the movement of the tire. The first set of segments are collapsed thereby to a diameter sufficiently small to permit the tire to be moved completely off the drum. Thus, the tire is separated from the drum more quickly and more easily than heretofore possible, while the amount of non-productive handling and movement of the tire itself is markedly reduced. Already being carried by the sling, and crane, the tire can be transported immediately to subsequent processing without rehandling.

Figure 2:
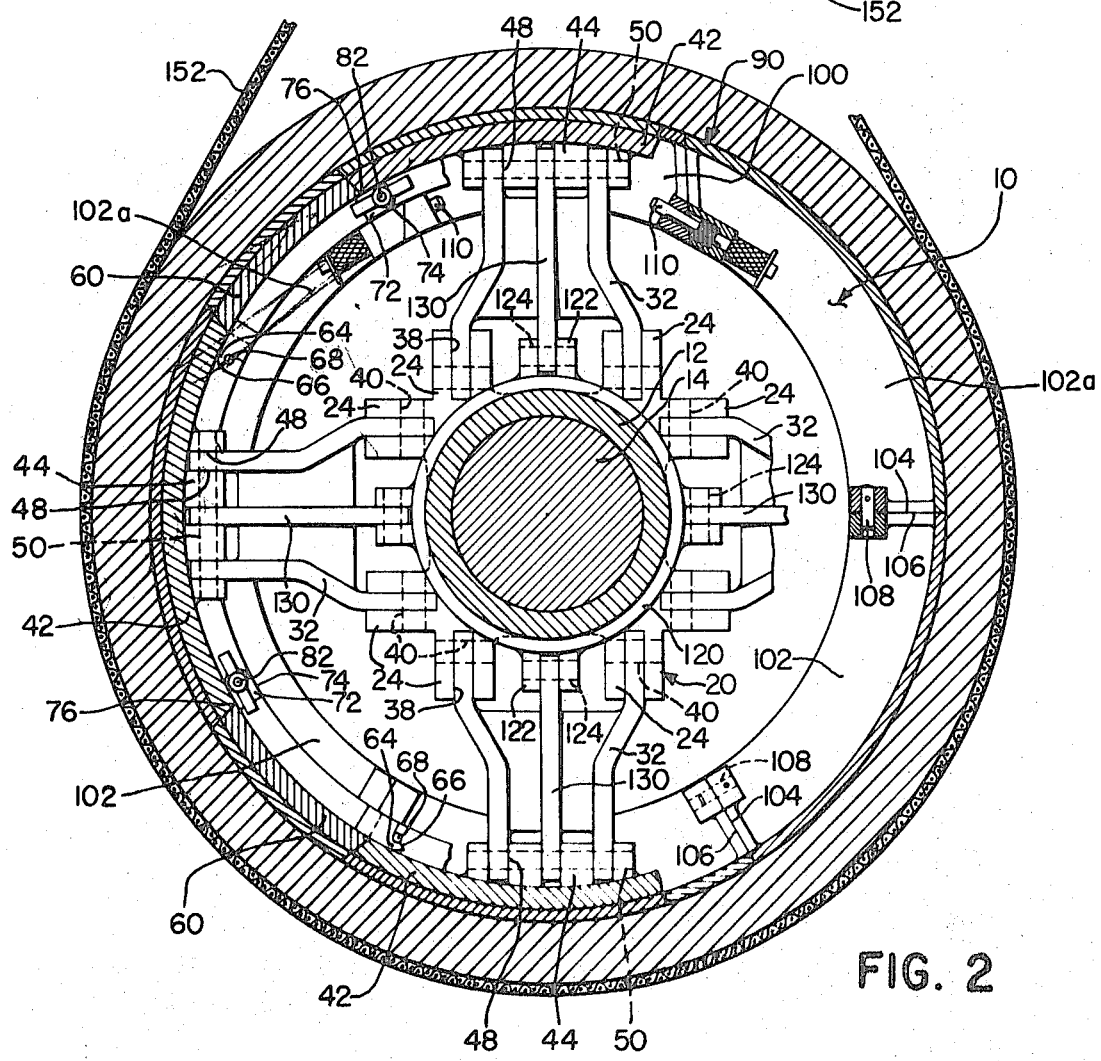
FIG. 2 is a transverse cross-section view, with portions broken away, illustrating features of the building drum of FIG. 1, taken as indicated by the line 2—2 in FIG. 1.

Referring to the drawings and particularly to FIGS. 1 and 2; a tire-building drum 10 in accordance with the invention comprises a central shaft 12 which is suitably adapted for mounting upon the driving spindle 14 of a conventional tirebuilding machine (not shown). Secured coaxially on the shaft and spaced axially therealong about equally distant from the mid-circumferential plane 16 of the drum are a pair of collars 20. Each collar has a plurality of pairs of slotted lugs 24 which each extend outwardly of the collar 20 parallel to an axial plane. The collars 20 each have four such pairs of lugs disposed about the axis 30 of the shaft. An articulating link 32 is pin-connected to each pair of lugs 24, the radially inward end of the link being received in the slots 38. Pivot pins 40 extend through corresponding holes in the lugs 24 and in the respective ends to permit the links 32 to swing respectively in each of four axial planes between a drum collapsed position and drum expanded position in which the links 32 are perpendicular to the axis 30 and against the stops 36 formed on the collars 20.

The articulating links 32 are connected in pairs to respective parti-cylindrical segments 42 each of which has a pair of hinge lugs 44 formed integrally therewith. The outer ends of the articulating links 32 are received in slots 48 in the respective lugs 44 and pivotally connected to the lugs 44 by pins 50 passing through holes in the lugs 44 and the outer ends of the links 32. The arrangement is such that each of the articulated segments 42 is movable along an arcuate path in axial plane, the articulating links being equal in length. In the drum 10, four articulated segments 42 constitute the first set of segments. It will be appreciated that the first set of segments may comprise any number of articulated segments, for example, three, four, or five. In each case, the number of segments in the first and second set are equal. The second set of the segments 60 are also parti-cylindrical and are individually connected to and between successive adjacent pairs of the articulated segments 42 of the first set, being connected at one axial edge by an inter-engaging tongue 64 and groove 66 provided with a replaceable wear pin 68. The opposite axial edge of each of the removable segments 60 has a plurality of lugs 72 interfitting with corresponding lugs 74 provided on the abutting edge 76 of the adjacent segment 42. The interfitting lugs 72 and 74 are bored, parallel to the axis 30, to receive one of the removable pins 82 by which the respective lugs and the segments 42 and 60 are connected.

The drum 10 includes a further set of segments which comprise a pair of shoulder flange end rings 90 which, in the expanded condition of the drum 10, are connected to the respective ends 92,94 of the first and second sets of segments by an annular tongue and groove arrangement 96 disposed in the radially inner wall of the respective segments 42,60 of the first and second sets. The radially and axially outward surfaces of the end rings 90 provide a portion of the continuous surface of the building drum and extend radially inwardly with respect to the cylindrical portion thereof to form support for the fabrication of the sidewall and bead portion of the tire.

The end rings 90 each comprise a key segment 100 and a plurality of arcuate segments 102 which cooperate to form the circumferentially continuous rings 90. The respectively abutting surfaces 104,106 of the segments 102 are held in relative alignment by stub dowels 108. A pair of spring-loaded, slidable, captive latch pins 110 mounted one in each of the segments 102a immediately adjacent the key segment 100 are used to unlatch and to lock the key segment 100 in the respective ring 90. Slidably mounted coaxially of the shaft 12 for sliding movement therealong between respective collars 20 is a sliding collar 120 having a plurality of lugs 122 extending radially thereof. Each lug supports a pin 124 which pivotally connects the inner end of a timing link 130 which extends angularly and is, at its other end, connected to the pin 50 carried by the lug 44. Each articulated segment 42 is thus connected by way of one of the timing links 130 and the sliding collar 120 to each of the other articulated segments, thereby insuring that their movements are coordinated in timed relation with each other.

Because, through the medium of the timing links 130 and collar 120, the articulated links 42 move coordinately, the first set of segments, the segments 42, is not collapsed accidentally during the removal or replacement of the other sets of segments. The drum 10 is, in its expanded working condition, rigidly resistant against both radial and axial forces by virtue of the support provided by the shoulder flange end rings 90 and by the cooperation of the articulated segments 42 and the removable segments 60 in circumferentially continuous edge-to-edge relation.

The drum 10 may, optionally, be provided with locking means effective to prevent collapse of the articulated segments in several ways. In the drum 10, the sleeve end 140 has a screw thread which accommodates a lock nut 142 which abuts the surfaces 144 of the articulating links 32 to hold the same in their radial orientation.

The foregoing description will have made operation of the drum 10 obvious to those skilled in the art. That operation may be summarized as follows. When the tire is completely fabricated upon the drum 10 and ready for removal, the tire is externally supported by a sling 150 having a wide, flexible band 152 which engages with and generally conforms arcuately to a major portion of the outer circumference of the tire, without significant deformation or movement thereof radially of the drum axis. The sling 150 can be positioned and supported by any convenient means, such as an overhead crane, or the like. While the tire is supported, either by the set of segments 42 or by the sling 150, the latch pins 110 are disengaged, permitting the key segments 100 to be removed from each of the end rings 90. The remaining segments 102 of the end rings are then removed from the tire. The pins 82 connecting the removable segments 60 of the second set are removed one at a time, releasing segments 60 successively from the drum within the tire. If not already in use to support the tire, the sling 150 is now disposed about the tire to support the weight thereof first without movement of the tire. The safety locking means, the nut 142, if used, is then removed. The sling 150 is then moved horizontally, parallel to the axis 30 to move the tire coaxially of the drum 10. This axial movement of the tire causes the articulated segments 42 to move axially and radially toward a fully collapsed position, illustrated in FIG. 3, small enough to permit the bead openings of the tire to pass over the collapsed drum. No other instrumentality is required to effect collapse of the drum. The complete collapse of the articulated segments may be expedited, if desired, simply by manually pushing the suspended tire horizontally and radially of the drum. Since the segments are balanced in any angular orientation of the drum, a small force is sufficient to cause the segments to be fully collapsed permitting the tire to be moved completely off the drum without any undesirable distortion of the tire itself. To reset the drum 10 for the next tire, the first set of segments, the segments 42, are expanded, moved radially outwardly to locate the links 32 against the stops 36. This may be accomplished by a slow rotation of the spindle on which the drum 10 is mounted, after which the locking means, if used, is replaced. The second set of segments, the segments 60, are successively placed between the adjacent pairs of the first set and the pins 82 inserted through the lugs. The shoulder ring segments 102 are inserted successively and the key segment 100 then placed and latched by the latch pins 110 whereupon the drum 10 is ready for the fabrication of another tire.

While certain representative embodiments and details have been shown for the purpose of illustrating the invention, it will be apparent to those skilled in the art that various changes and modifications may be made therein without departing from the spirit or scope of the invention.

What is claimed is:

1. A method of removing an uncured tire from a tire building drum on which the tire has been built, wherein said drum has an open end and comprises a plurality of segments each movable in coordinately timed relation with the others of said segments and spaced about the longitudinal axis of the drum, said segments being movable simultaneously inwardly toward said axis and axially therealong to collapse said drum in response to force exerted on any of said segments in a direction toward said open end, said method comprising effecting such movement to collapse said drum simply by carrying said tire toward and over said open end.

2. A method as claimed in claim 1, including supporting said tire coaxially of said drum during exertion of said force.

3. A method as claimed in claim 2, including effecting the support of said tire by means engaging only the exterior surface of said tire while collapsing the drum.

4. The method as claimed in claim 1, including, while said tire is so supported, moving the tire coaxially of and axially off said drum.

5. The method as claimed in claim 1, including engaging at least one of said segments with an interior surface of said tire while moving said tire in a direction parallel to said axis thereby to continue the movement of said segments toward said axis.

6. A method as claimed in claim 1, including supporting said tire by means suspended from above the tire, and after an initial movement of said tire axially of said drum, moving said tire a small distance radially of said axis to effect a further inward movement of said segments toward said axis.

7. A method as claimed in claim 1, said tire being of greater weight than can be maneuvered manually, and said carrying including engaging a portion of the outer circumference thereof with a flexible supporting band.

8. A method as claimed in claim 1, wherein said drum includes at least one set of segments additional to said plurality of segments, further comprising removing completely each of said at least one additional sets of segments while supporting said tire and before moving said tire coaxially of itself.

9. A tire building drum comprising a shaft mountable on a spindle of a tire building machine, a plurality of sets of segments cooperable to provide a rigid tire building surface, one set of segments being connected to said shaft and to each other for coordinately timed movement relative to said shaft, the remainder of said sets comprising segments individually removably connectable to the respectively associated segments of said one set, means responsive to movement of a tire coaxially of said drum and operative after removal of said remainder of said sets to collapse said one set inwardly to allow continuing coaxial movement of said tire off said drum, said means responsive to movement of said tire comprising means articulatedly connecting the segments of said one set to said shaft for effecting said movement of said segments of said one set axially away from said spindle and radially inwardly toward said shaft.

10. A drum as claimed in claim 9, wherein said means connecting said segments of said one set comprises a pair of collars secured coaxially on said shaft and spaced axially therealong, and a plurality of articulating links each pinconnected respectively to one of said collars and to a respectively associated end portion of one of the segments of said one set.

11. A drum as claimed in claim 9, wherein at least one of said remainder of said sets of segments comprises a drum end ring extending radially inwardly from and with respect to the said one set of segments while the same are in their radially outward position to form a portion of said building surface for supporting a sidewall and bead portion of said tire.

12. A drum as claimed in claim 11, said end ring comprising a key segment and a plurality of arcuate segments cooperable to form an endless annular ring.

13. A drum as claimed in claim 12, said end ring being cooperatively inter-engageable with the respectively associated ends of the segments of said one set and disposed radially inwardly thereof.

14. A drum as claimed in claim 9, including means interconnecting the respective segments of said one set for radially inward and radially outward movement in coordinated timed relation with respect to one another.

15. A drum as claimed in claim 14, said means interconnecting said respective segments of said one set comprising means slidable coaxially of said drum, and a plurality of timing links each pin-connected to said slidable means and to a respectively associated one of said connected segments.

16. A drum as claimed in claim 15, wherein said means connecting said respective segments comprises a pair of collars secured coaxially on said shaft and spaced axially therealong, and a plurality of articulating links each pin-connected respectively to one of said collars and to the respectively associated end portion of one of said respective segments, said sliding means comprising a collar mounted coaxially and slidably on said shaft between the first said collars.

17. A drum as claimed in claim 16, further including lock means for locking said at least one of said links in a position perpendicular to said shaft.

18. A drum as claimed in claim 17, said lock means comprising a nut threadably engageable with said shaft to bear against respectively associated links while the same are in said position.

* * * * *